(12) United States Patent
Ko et al.

(10) Patent No.: US 6,600,594 B1
(45) Date of Patent: Jul. 29, 2003

(54) INTELLIGENT VARIABLE OPTICAL ATTENUATOR WITH CONTROLLER AND ATTENUATION CALIBRATION

(75) Inventors: Jimmy Ko, San Leandro, CA (US); Kevin Tseng, San Leandro, CA (US)

(73) Assignee: Lightech Fiberoptics, Inc., San Leandro, CA (US)

( * ) Notice: Subject to any disclaimer, the term of this patent is extended or adjusted under 35 U.S.C. 154(b) by 8 days.

(21) Appl. No.: 10/081,765

(22) Filed: Feb. 21, 2002

(51) Int. Cl.[7] .................................................. H01S 3/00
(52) U.S. Cl. .................... 359/337; 359/337.13; 359/161
(58) Field of Search ........................... 359/337, 337.13, 359/161

(56) References Cited

U.S. PATENT DOCUMENTS

| | | | |
|---|---|---|---|
| 4,378,490 A | 3/1983 | d'Auria Luigi | 250/201 |
| 4,398,806 A | 8/1983 | Bennett et al. | 350/394 |
| 4,776,660 A | 10/1988 | Mahlein et al. | 350/96.16 |
| 5,031,188 A | 7/1991 | Koch et al. | 372/50 |
| 5,144,637 A | 9/1992 | Koch et al. | 372/50 |
| 5,148,233 A | 9/1992 | Imamura et al. | 356/243 |
| 5,477,376 A | 12/1995 | Iwatsuka et al. | 359/283 |
| 5,673,342 A | 9/1997 | Nelson et al. | 385/24 |
| 5,712,864 A | 1/1998 | Goldstein et al. | 372/50 |
| 6,061,171 A | 5/2000 | Taylor et al. | 359/341 |
| 6,149,278 A | 11/2000 | Mao et al. | 359/862 |
| 6,205,280 B1 | 3/2001 | Wagoner et al. | 385/140 |
| 6,289,148 B1 | 9/2001 | Lin et al. | 385/24 |
| 6,289,155 B1 | 9/2001 | Wade | 385/37 |
| 6,339,663 B1 | 1/2002 | Leng et al. | 385/24 |
| 6,535,330 B1 * | 3/2003 | Lelic et al. | 359/337.13 |

FOREIGN PATENT DOCUMENTS

| | | | |
|---|---|---|---|
| FR | 2798023 | * | 8/2000 |
| WO | WO 02/069024 | * | 9/2002 |

OTHER PUBLICATIONS

Harmonic Inc. HW 1000 CWDM coupler.
Canoga Perkins WA–2 Wavelength Division Multiplexer.
Koncent Inc. WDC series WDM couplers.
Oplink Communications, Inc. HWDM series and MWDM 1325 Series couplers.

* cited by examiner

Primary Examiner—Mark Hellner
(74) Attorney, Agent, or Firm—George O. Saile; Stephen B. Ackerman

(57) ABSTRACT

A variable optical attenuation system has at least one variable optical attenuation device that receives a light signal, attenuates the light signal, and transmits an attenuated light signal. The variable optical attenuator system further has a controller circuit in communication with the variable optical attenuation device to provide an attenuation control signal to the variable optical attenuation device to cause the variable optical attenuation device to adjust an attenuation factor of the variable optical attenuation device. The variable optical attenuator system also has a data retaining device such as an EEPROM in communication with the controller circuit. The data retaining device has a listing of attenuation factors and corresponding attenuation control signals. A communication interface such as a serial data link, within the variable optical attenuator system provides communication between the controller circuit and an external command system. The external command system indicates a desired attenuation factor and the control circuit accesses the data retaining device to retrieve the corresponding attenuation control signal. The control circuit transmits the corresponding attenuation control signal to the variable optical attenuation device, which then adjusts to assume the desired attenuation factor. A calibration method for the variable optical attenuation system corresponds the attenuation factors to the attenuation control signals and stores the attenuation factors and the corresponding control signals to the data retaining device.

28 Claims, 8 Drawing Sheets

| | COMMAND FORMAT | DESCRIPTIONS | EXAMPLE |
|---|---|---|---|
| 1 | ? N<0xd> | VOA #N CURRENT ATTENUATION QUERY RESPONSE: $N_1N_2N_3N_4$<0xd> | ? 1↵ VOA#1 CURRENT ATTENUATION QUERY RESPONSE: 12.34<0xd> |
| 2 | C N<0xd> | SELECT VOA#N AS THE ACTIVE MODULE | C 1↵ SELECT VOA#1 AS THE ACTIVE MODULE |
| 3 | A $N_1N_2N_3N_4$<0xd> | SET THE ACTIVE VOA MODULE ATTENUATION TO $N_1N_2N_3N_4$ dB | A 1623↵ SET THE ACTIVE VOA MODULE ATTENUATION TO 16.23 dB |
| 4 | S N<0xd> | SAVE VOA#N CURRENT ATTENUATION TO EPROM | S 1↵ SAVE VOA#1 CURRENT ATTENUATION TO EPROM |
| 5 | A N $n_1n_2n_3n_4$ N: 1~4 | SET VOA#N TO STEP $n_1n_2n_3n_4$ from zero/referenc point | A 0345↵ SET THE VOA#1 TO STEP 345 FROM ZERO/REFERENCE POINT |
| 6 | W $n_1n_2n_3n_4$ $m_1m_2m_3m_4m_5$ | SAVE ATTENUATION DATA $m_1m_2m_3m_4m_5$ dB TO EPROM AT ADDRESS $n_1n_2n_3n_4$ | W 123402000↵ SAVE ATTENUATION DATA 20dB TO EPROM AT ADDRESS 1234 |
| 7 | R $n_1n_2n_3n_4$ | READ ATTENUATION DATA FROM EPROM AT ADDRESS $n_1n_2n_3n_4$ | R 1234↵ READ ATTENUATION DATA FROM EPROM AT ADDRESS 1234 |

INTELLIGENT VARIABLE OPTICAL ATTENUATOR WITH CONTROLLER AND ATTENUATION CALIBRATION

BACKGROUND OF THE INVENTION

1. Field of the Invention

This invention relates to optical transmission systems and more particularly to variable optical attenuators (VOAs) within optical transmission systems. Even more particularly this invention relates to circuits and methods for automatically adjusting variable optical attenuators and to methods and systems for calibrating variable optical attenuators to allow for the automatic adjustment of the variable optical attenuators.

2. Description of Related Art

Variable optical attenuators (VOA) are well known in the art and permit the attenuation of optical or light signals as they are transferred in an optical transmission system. Variable optical attenuators are of two fundamental types, mechanical and non-mechanical. The mechanical variable optical attenuators have moving parts such as stepper motors to adjust an optical filter to vary the attenuation. In non-mechanical variable optical attenuators, the mechanism employed to adjust the attenuation is either a magneto-optic effect or thermo-optic effect that modifies the light waveguide. The attenuation settings of a non-mechanical variable optical attenuator are generally wavelength dependent. Mechanical variable optical attenuators on the other hand provide adjust the optical attenuation in a manner that provides relative independence of wavelength.

Mechanical variable optical attenuators such as described in U.S. Pat. No. 6,149,278 (Mao, et al.) have a pair of substantially parallel mirrors that attenuate an optical signal based, at least in part, on the rotation angle of the mirrors. When the pair or mirrors is in a predetermined position, an input optical signal is directed from an input port to an output port with a minimum insertion loss. As the pair of mirrors is rotated, the optical signal is shifted in a parallel fashion. This provides increased insertion loss and an attenuated signal at the output port. The pair of mirrors are rotated a stepper motor or similarly controlled mechanism.

An alternate mechanical variable optical attenuator is described in U.S. Pat. No. 4,398,806 (Bennett, et al.). Bennett et al. describes a variable optical attenuator that has wedge shaped plates that are adjusted for form Fresnel lens structures. Each of plates has two surfaces defined by an angle of convergence, a pair plates are supported with two of the surfaces of each plate being spaced apart and in parallel alignment and with the angle of convergence of the two plates being in opposite directions. A second pair of plates are supported with two of the surfaces of each plate being spaced apart and in parallel alignment and with the angle of convergence the plates. One plate of each pair of plates is adjusted to modify the attenuation of the variable optical attenuator.

As the demand for communication networks has increased, wavelength division multiplexing (WDM) is becoming the technique used for increasing the amount of information that can be carried on-fiberoptic cables. Variable optical attenuators are employed within the network to allow the equalization of the gain of the bands of light frequencies transmitted on the fiberoptic cables. Further, the variable optical attenuators allow the addition and removal of selected bands or channels at various terminal points of the communication network.

Refer now to FIG. 1 for an overview of an application of a variable optical attenuator. FIG. 1 illustrates an amplification and balancing device for a fiberoptic communication channel. The light 10 from a fiberoptic cable in a wavelength division multiplexed communication system is composed of multiple wavelengths $\lambda_1, \lambda_2, \lambda_3, \ldots, \lambda_n$. Prior to equalization and balancing each of the wavelengths $\lambda_1, \lambda_2, \lambda_3, \ldots, \lambda_n$ have non-equal amplitudes or gains. For proper operation these amplitudes or gains must be equal or balanced.

The light 10 from a fiberoptic cable is the input to an optical demultiplexer 15. The optical demultiplexer 15 separates the wavelengths $\lambda_1, \lambda_2, \lambda_3, \ldots, \lambda_n$ of the multiplexed light signal 10 into the individual light signals 20a, 20b, ..., 20n. The individual light signals 20a, 20b, ..., 20n are each applied respectively to variable optical attenuators 25a, 25b, ..., 25n. The outputs of the variable optical attenuators 25a, 25b, ..., 25n are then the inputs to the multiplexer 30. The individual light signals 20a, 20b, ..., 20n are then recombined to form the input light signal input to the erbium-doped fiber amplifier (EDFA) 35. The erbium-doped fiber amplifier 35 amplifies the light signal to form the output light signal 40 that is transferred to a subsequent fiberoptic cable.

The variable optical attenuators 25a, 25b, ..., 25n are each calibrated to adjust the gain of the wavelengths $\lambda_1, \lambda_2, \lambda_3, \ldots, \lambda_n$ of the individual light signals 20a, 20b, ..., 20n such that outputs of the variable optical attenuators 25a, 25b, ..., 25n are approximately equal. The recombined and amplified light signal 40 now has wavelengths $\lambda_1, \lambda_2, \lambda_3, \ldots, \lambda_n$ that have equal gain and are balanced.

An alternate application for variable optical attenuators is shown in FIG. 2. This application illustrates a switching application when separate wavelength channels within different light signals 110, 125, 130, and 175 are added and removed for redirection to receiving and transmitting nodes (not shown) of the communication network. Generally the light signals 110 and 130 are demultiplexed to their individual wavelength channels. Those individual wavelength channels that are to be removed from the light signals 110 and 130 are separated and transferred to the receiving nodes. The individual wavelength channels that are to be added are combined with the remaining wavelength channels to form the light signals 125 and 175. In order for the removed wavelength channels and the newly formed light signals to have appropriate balance and gain across all the wavelength channels, a variable optical attenuator is added to each channel to perform the attenuation to equalize the gain of each channel.

Referring now to FIG. 2 for a more detailed discussion. The light signals 110 and 130 are respectively the inputs to the demultiplexers 115 and 135. The demultiplexers 115 and 135 decompose the light signals 115 and 135-into their component wavelength channels. Those wavelength channels 116 that are to be transferred to the light signal 125 become a first set of inputs to the multiplexer 120. Those wavelength channels 117 that are to be removed from the decomposed light signal 110 are transferred to the set of variable optical attenuators 150. Similarly, those wavelength channels 136 that are to be transferred to the light signal 175 are transferred to the multiplexer 170 and those wavelength channels 137 that are to be removed from the decomposed light signal 130 are the inputs to the set of variable optical attenuators 150.

The variable optical attenuators 150 attenuate the wavelength channels 117 to balance and equalize the light signals to form the wavelength channels 119. The wavelength channels 119 are the inputs to the demultiplexer 140, which decomposes the wavelength channels into the individual light signals 142 that are transferred to the receiving nodes of the communication system. Similarly, the variable optical attenuators 150 attenuate the wavelength channels 137 to balance and equalize the light signals to form the wavelength channels 139. The wavelength channels 139 are the inputs to the demultiplexer 160, which decomposes the wavelength channels into the individual light signals 162 that are transferred to other receiving nodes of the communication system.

To add wavelength channels to the light signals 125, and 175 the multiplexers 145 and 155 from the transmitting nodes of the communication system receive the individually separated wavelength channels 147 and 157 respectively. The multiplexers 145 and 155 combine the wavelength channels 147 and 157 to form the light signals 149 and 159 that are then inputs to the sets variable optical attenuators 150. The variable optical attenuators 150 balance and equalize the gain of the light signals 149 and 159 to respectively form the light signals 118 and 138. The light signals 118 and 138 are then respectively inputs to the multiplexers 120 and 170. The multiplexer 120 combines the light signals 116 and 118 to form the light signal 125, which is transferred, to a fiberoptic cable for transmission to a next node of the communication network. Likewise, the multiplexer 170 combines the light signals 136 and 138 to form the light signal 175, which is transferred, to a fiberoptic cable for transmission to a next node of the communication network.

The variable optical attenuators 150 balance and equalize the gain of the light signals 149 and 159 to compensate for wavelength dependent insertion loss of the optical components of the system. Further the variable optical attenuators 150 can be placed to receive the light signals 110, 175, 125, and 130 to compensate for insertion loss in the transmission media of any of the light signals 110, 175, 125, and 130. For example if the Light signals 110 and 175 have optical components inserted into the path such as another receiver, the variable optical attenuator 150 can be applied to the light signals 110, 175, 125, and 130 to provide stable signals when the receiver is placed in the path.

FIG. 3 illustrates a variable optical attenuator control system as illustrated by U.S. Pat. No. 6,061,171 (Taylor et al.). Light signals 200a, . . . , 200d are inputs to the variable optical attenuator devices 205a, . . . , 205d. The adjustments of the attenuation of the variable optical attenuator devices 205a, . . . , 205d are communicated from the variable optical attenuator controllers 225a, . . . , 225d by the control signals 235a, . . . , 235d. Taylor et al. describes a feedback structure that allows the variable optical attenuator controllers 225a, . . . , 225d to adjust the variable optical attenuator devices 205a, . . . , 205d based on the relative power or intensity of the attenuated light signals 207a, . . . , 207d. The variable optical attenuator devices 205a, . . . , 205d attenuate the light signals 200a, . . . , 200d to form the attenuated light signals 207a, . . . , 207d, which are the input signals to the couplers 210a, . . . , 210d.

The couplers 210a, . . . , 210d sample a portion of the attenuated light signals 207a, . . . , 207d and split the attenuated light signals 207a, . . . , 207d to light signals 218a, . . . , 218d. The light signals 218a, . . . , 218d are inputs to the optical monitor control system 220 that measures the relative magnitudes of the light signals 218a, . . . , 218d and thus the intensity of the light signals 207a, . . . , 207d. The couplers 210a, . . . , 210d transfer the remaining light signals to the fiberoptic cable 215a, . . . , 215d.

The optical monitor control system 220 transfers the measured values of the light signals 218a, . . . , 218d as the electrical signals 223a, . . . , 223d to the variable optical attenuator controllers 225a, . . . , 225d. Each of the variable optical attenuator controllers 225a, . . . , 225d determine from the power of the light signals 218a, . . . , 218d the number of steps or amount of movement is required to adjust the attenuation factor of the variable optical attenuators 205a, . . . , 205d.

"Backlash" denotes the attenuation setting accuracy when adjusting the variable optical attenuator devices 205a, . . . , 205d including adjustment made by reversing the direction of motor operation. It can be shown that the accuracy or "backlash" of the system as shown can cause the variable optical attenuator devices 205a, . . . , 205d to have error in their adjustment.

The feedback from the couplers 210a, . . . , 210d, the optical monitor control system 220 and the variable optical attenuator controllers 225a, . . . , 225d can cause excessive amounts of the "backlash."

SUMMARY OF THE INVENTION

An object of this invention is to provide a variable optical adjustment system to provide adjustment to a variable optical attenuator based on its desired attenuation factor.

Another object of this invention is to provide a communication system for transmitting a desired attenuation factor for a variable optical attenuator to a variable optical attenuator controller.

Further, another object of this invention is to provide a method for calibrating a variable optical attenuator to determine and record the adjustment steps versus the attenuation factor for a variable optical attenuator.

To accomplish at least one of these and other objects, a variable optical attenuation system has at least one variable optical attenuation device that receives a light signal, attenuates the light signal, and transmits an attenuated light signal. The variable optical attenuator system further has a controller circuit in communication with the variable optical attenuation device to provide an attenuation control signal to the variable optical attenuation device to cause the variable optical attenuation device to adjust an attenuation factor of the variable optical attenuation device. The variable optical attenuator system also has a data retaining device such as an EEPROM in communication with the controller circuit. The data retaining device has a listing of attenuation factors and corresponding attenuation control signals. A communication interface such as a serial data link, within the variable optical attenuator system provides communication between the controller circuit and an external command system. The external command system indicates a desired attenuation factor and the control circuit accesses the data retaining device to retrieve the corresponding attenuation control signal. The control circuit transmits the corresponding attenuation control signal to the variable optical attenuation device, which then adjusts to assume the desired attenuation factor.

The variable optical attenuation system is calibrated to correspond the attenuation factors to the attenuation control signals and store the attenuation factors and the corresponding control signals to the data retaining device. During calibration, the communication interface is used by an external calibration system to command the control circuit to send attenuation control signals to the variable optical attenuator device to adjust the attenuation factor. The external calibration system then measures the attenuation factor that corresponds to an adjustment position set by the attenuation control signal. The measurement is then transmitted from the external calibration system to the control circuit for placement within the data retaining device.

To facilitate communication during the calibration, the communication interface operates with a set of protocols. This protocol includes a send control signal magnitude code. The send control signal magnitude code include a magnitude value that is used by the control circuit to transmit the magnitude of the control signal to cause the selected variable optical attenuator device to advance to a specified adjustment. The protocol further includes a save attenuation factor code. The external calibration system transmits the save attenuation factor to the control circuit indicating that the present setting of the variable optical attenuator device has the appended attenuation and that the control signal magnitude and the attenuation should be placed in the data retaining device. At the completion of the calibration process, the external calibration system verifies the contents of the data retaining device by sending a read attenuation factor code. The read attenuation factor code instructs the control circuit to transmit the attenuation factor for the denoted address location within the data retaining device.

The variable optical attenuation system communicates with the external command system through the communication interface using a communication protocol. The communication protocol includes a current attenuation query code that is transmitted from the external command system requesting a current attenuation factor at which the variable optical attenuation device is set. A current attenuation response code is transmitted from the controller circuit to the external command system indicating the current attenuation factor of the variable optical attenuation device. The external command system sends a select active device code to the controller circuit indicating which variable optical attenuation device is to be active. A set active device attenuation code is transmitted from the external command system to the controller circuit indicating the desired attenuation factor at which the active variable optical attenuation device is to be set. Once the variable optical attenuator device is set to a desired attenuation factor for the particular fiber communication link connected to the variable optical attenuator device, the external command system sends a store active device attenuation code to the controller circuit commanding the controller circuit to record a current attenuation factor for the active device.

BRIEF DESCRIPTION OF THE DRAWINGS

FIG. 6 is table defining the communication protocol for calibrating and adjusting variable optical attenuators of this invention.

DETAILED DESCRIPTION OF THE INVENTION

Figure 1:
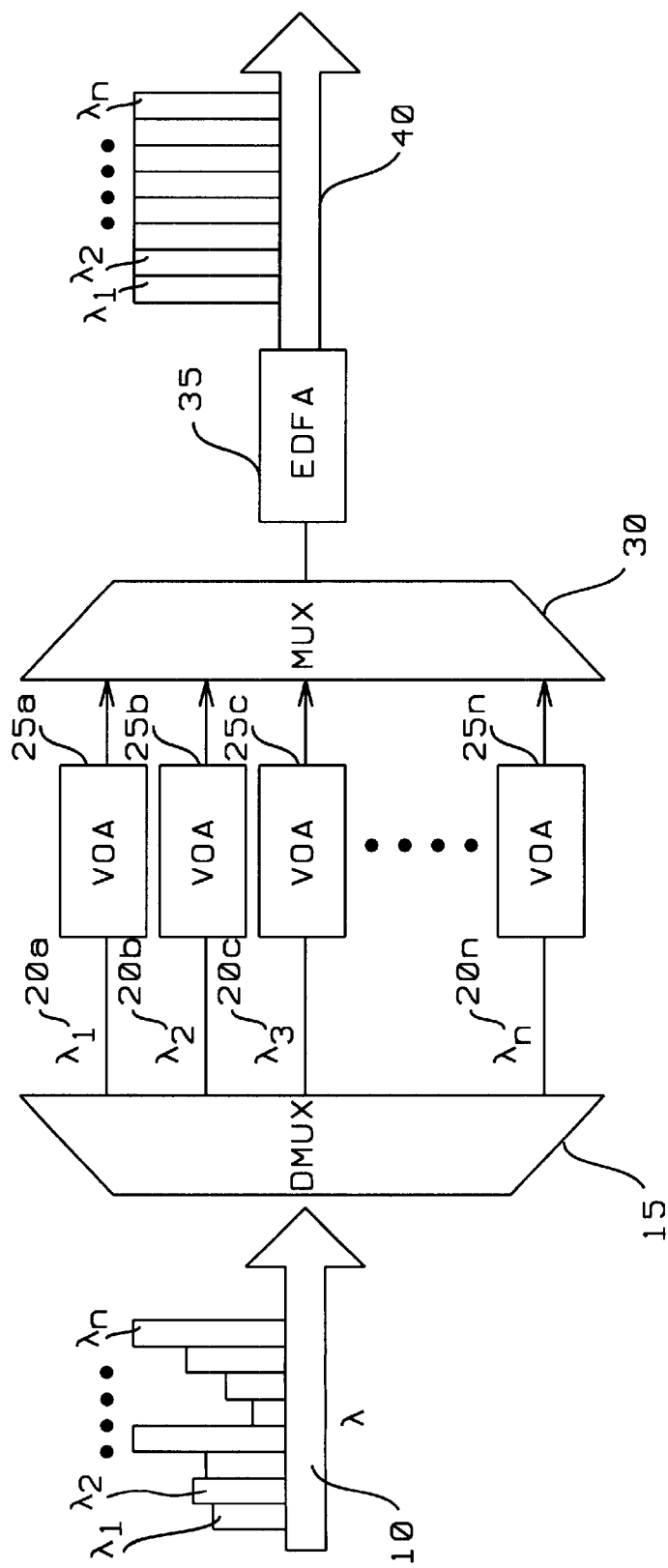
FIG. 1 is a schematic diagram of a balancing and equalization application of a variable optical attenuator of the prior art.
Figure 2:
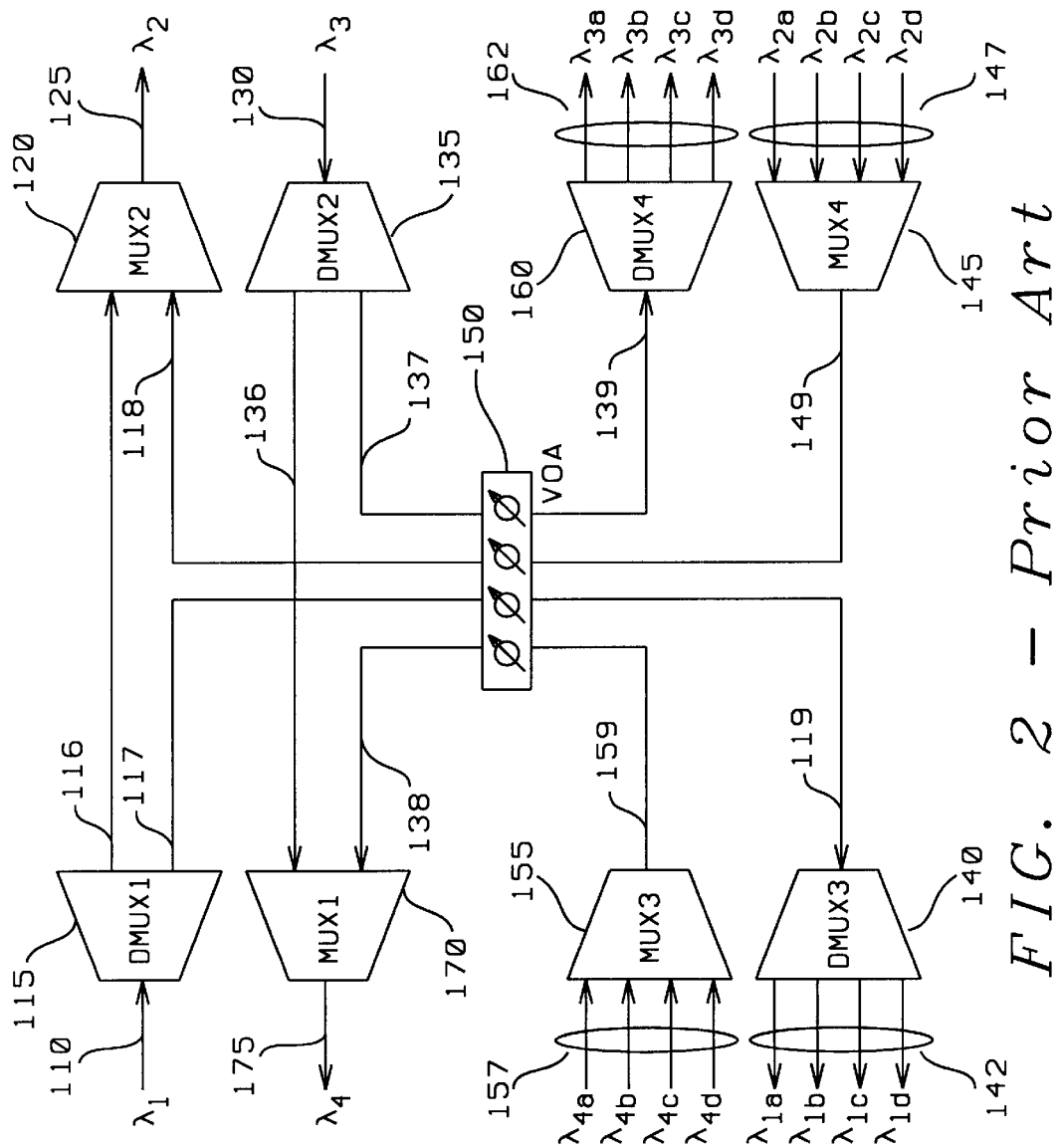
FIG. 2 is a schematic diagram of an adding and removing wavelength channel application for a variable optical attenuator of the prior art.
Figure 3:
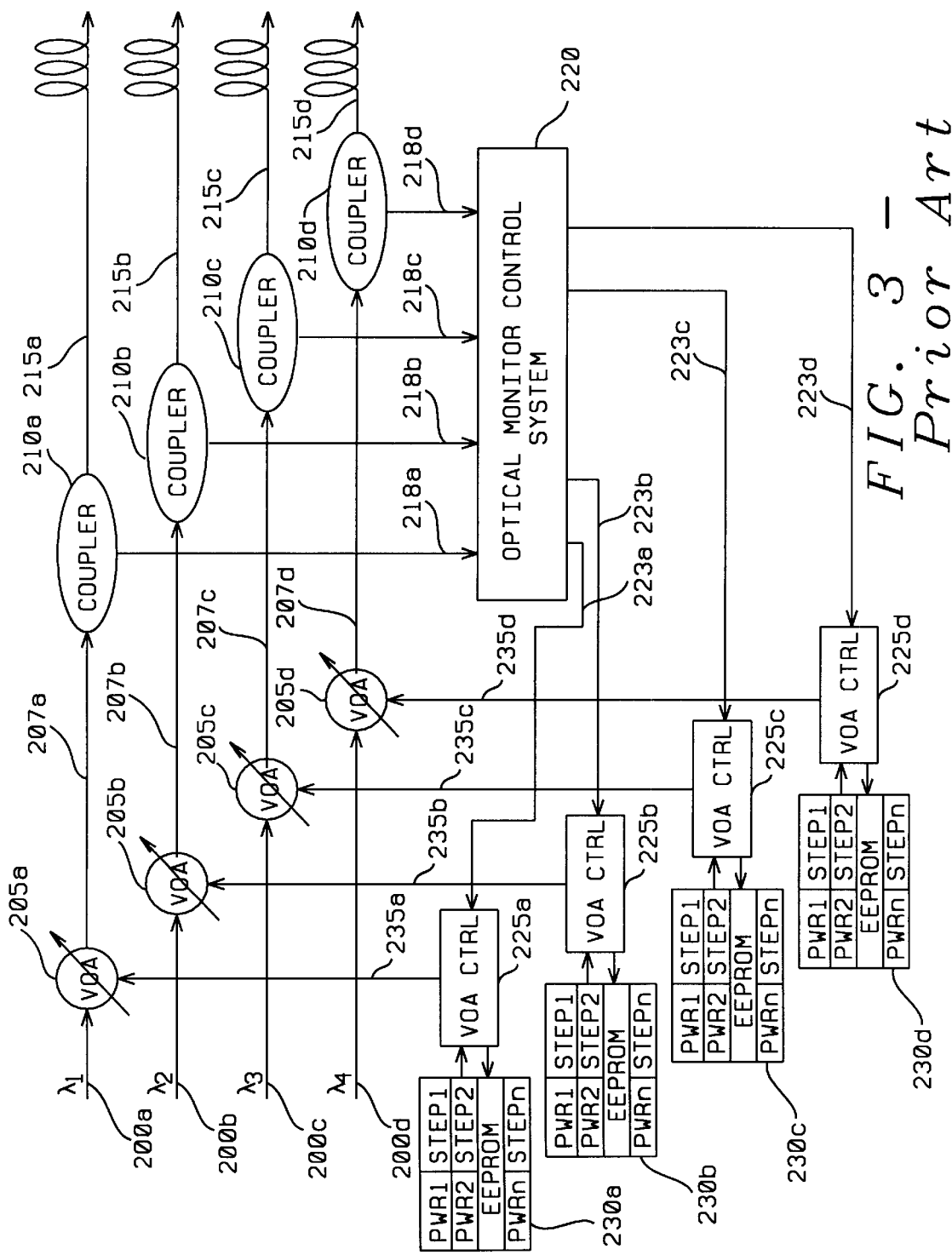
FIG. 3 is a schematic diagram of a variable optical attenuator adjustment system of the prior art.
Figure 4:
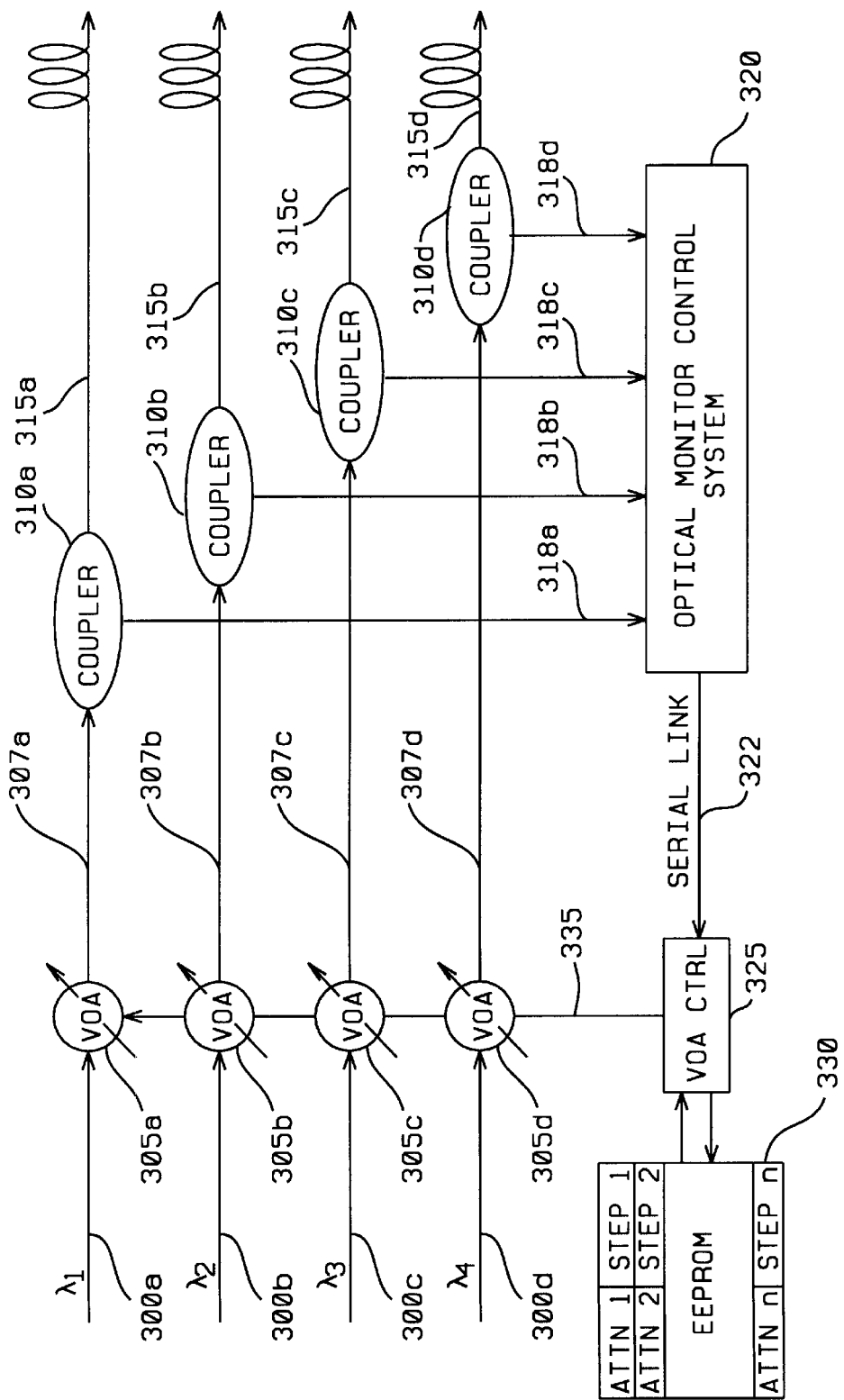
FIG. 4 is a schematic diagram of a variable optical attenuator adjustment system of this invention.

The variable optical attenuator system of this invention, as shown in FIG. 4, has light signals $300a, \ldots, 300d$ as inputs to the variable optical attenuator devices $305a, \ldots, 305d$. The attenuation of each of the variable optical attenuator devices $305a, \ldots, 305d$ is controlled by the variable optical attenuator controller 325 from settings stored in the EEPROM 330. The setting or the amount of steps or pulses necessary to cause each variable optical attenuator device $305a, \ldots, 305d$ to be adjusted is stored with a corresponding attenuation. The variable optical attenuator controller 325 has a serial link 322 that contains a communication protocol indicating the attenuation factor to which an activated variable optical attenuator device $305a, \ldots, 305d$ is to be set. The variable optical attenuator controller 325 receives the coding designating the amount of attenuation that is desired for a desired variable optical attenuator device $305a, \ldots, 305d$. The variable optical attenuator controller 325 determines the location within the EEPROM the location of the attenuation factor and the corresponding number of steps or pulses required to adjust the activated variable optical attenuator device $305a, \ldots, 305d$ from a reference setting to the setting for the desired attenuation factor.

If the activated variable optical attenuator device $305a, \ldots, 305d$ is at an attenuation factor other than the reference setting, the variable optical attenuator controller 325 must calculate the amount of adjustment the variable optical attenuator device $305a, \ldots, 305d$ must make in order to achieve the desired attenuation factor. The control signal 335 is transferred from the variable optical attenuator controller 325 to the activated variable optical attenuator device $305a, \ldots, 305d$.

The outputs of each of the variable optical attenuator devices $305a, 305d$ are the attenuated light signals $300a, \ldots, 300d$ applied to the couplers $310a, \ldots, 310d$. The couplers $310a, \ldots, 310d$ sample a portion of the attenuated light signals $307a, \ldots, 307d$ and split the attenuated light signals $307a, \ldots, 307d$ to light signals $318a, \ldots, 318d$ and $315a, \ldots, 315d$. The light signals $318a, \ldots, 318d$ are inputs to the optical monitor control system 320 that measures the relative magnitudes of the electrical $318a, \ldots, 318d$ and thus the intensity of the light signals $307a, \ldots, 307d$. The couplers $310a, \ldots, 310d$ transfer the remaining light signals to the fiberoptic cable $315a, \ldots, 315d$.

The optical monitor control system 320 compares the magnitude of the light signals 318 and thus the intensity of the light $307a, \ldots, 307d$ to the intensity of the light signals $300a, \ldots, 300d$ to determine the attenuation factor required for the application of the variable optical attenuators.

The variable optical attenuator controller 325 has a communication interface that is the serial link 322 such as the well known Electronic Industries Alliance (EIA) standard RS-232 that in this embodiment is connected to the optical monitor control system 320. The serial link 322 provides the physical circuitry and transmission medium to transfer the communication protocol that allows the variable optical attenuator controller 325 to activate a desired variable optical attenuator device $305a, \ldots, 305d$, determine control signal required by the transmitted attenuation factor. Refer now to FIG. 6 for a discussion of the protocol of the communication interface. The first command (1) is a query from the external system such as the optical monitor control system 320 to request that the variable optical attenuator controller 325 provide the attenuation setting of a designated variable optical attenuator device $305a, \ldots, 305d$. The response from the variable optical attenuator controller 325 is the attenuation setting for the requested variable optical attenuator device $305a, \ldots, 305d$.

The second command (2) is transmitted from the external system to the variable optical attenuator controller 325 designated which of the variable optical attenuators 305*a*, . . . , 305*d* are to be activated. The third command (3) is transmitted from the external system to the variable optical attenuator 325 designating the attenuation factor at which the selected variable optical attenuator device 305*a*, . . . , 305*d* is to be set. The variable optical attenuator controller 325 then extracts the number of steps or pulsed required to set the active variable optical attenuator device 305*a*, . . . , 305*d* is adjusted from a reference setting to the required attenuation and then determines the number of the steps or pulses required from the present setting.

The fourth command (4) is transmitted from the external system to the variable optical attenuator controller 325 commanding the variable optical attenuator controller 325 to store the present attenuation setting to the EEPROM 330. This allows the variable optical attenuator controller 325 to determine any future adjustments as the number of pulses required to vary the attenuation factor of the active variable optical attenuator device 305*a*, . . . , 305*d*.

The remaining commands (5–7) provide a command protocol for calibrating the variable optical attenuator devices 305*a*, . . . , 305*d* to determine the attenuation of each of the variable optical attenuator devices 305*a*, . . . , 305*d* versus the settings or pulses of the variable optical attenuators. These commands are to be discussed hereinafter.

Figure 5:
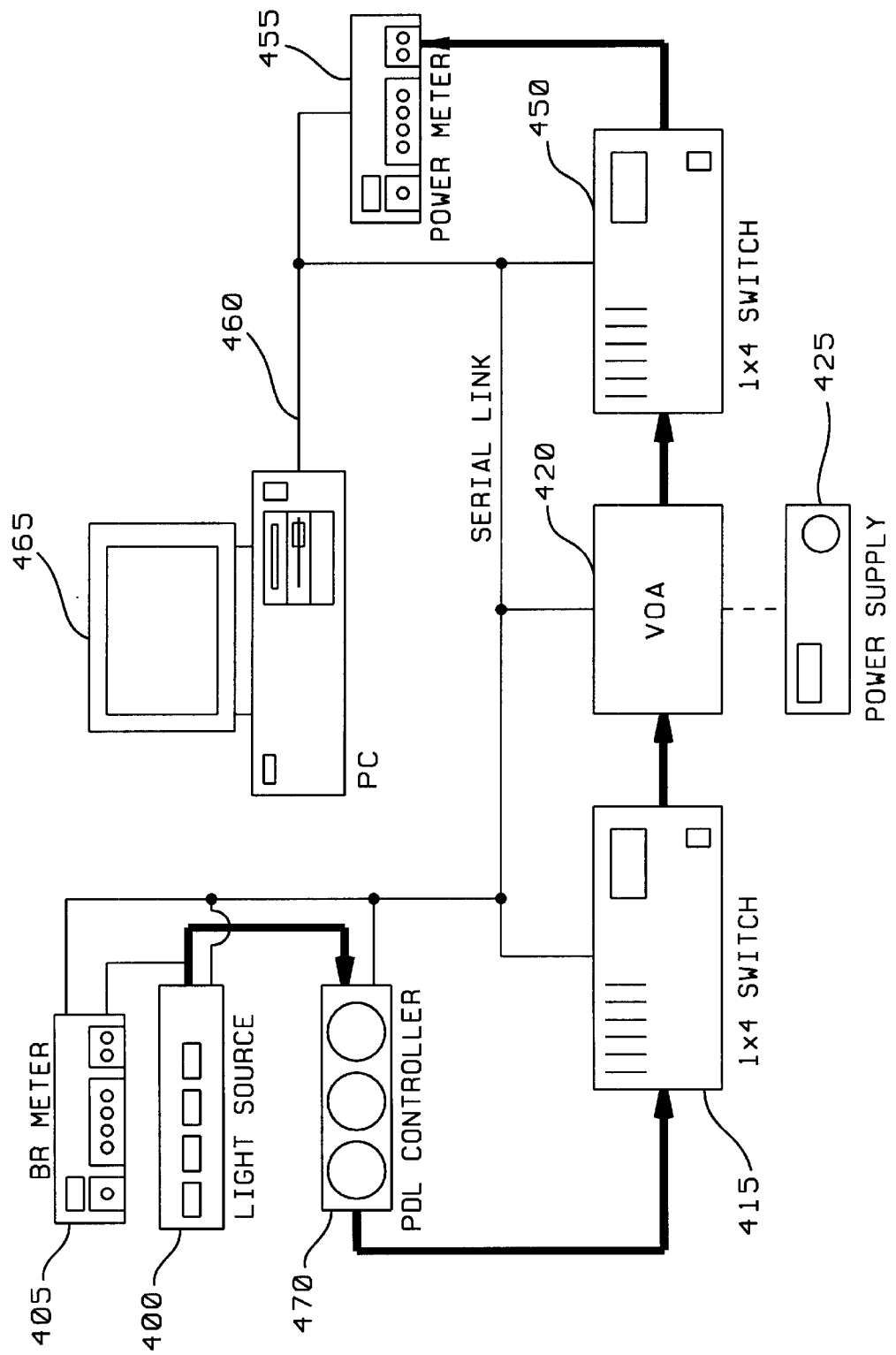
FIG. 5 is block diagram of a variable optical attenuator calibration system of this invention.

Since the commands use the attenuation factor to determine the setting of the variable optical attenuator devices 305*a*, . . . , 305*d*, the EEPROM 330 must contain the attenuation factors and the setting or number of pulses from a reference setting to determine how to adjust the variable optical attenuator devices 305*a*, . . . , 305*d* to desired attenuation. By setting the variable optical attenuator devices 305*a*, . . . , 305*d* directly rather than using a feedback mechanism such as shown in the prior art, the "backlash" is avoided or at least minimized. However, in order to take advantage of the direct setting of the attenuation factor of this invention, each variable optical attenuator device 305*a*, . . . , 305*d* must be calibrated to correspond the attenuation factor to a setting or number of pulses from a reference setting. To accomplish this, a calibration system, as shown in FIG. 5, has a light source 400 that emits a standardized light signal. The back reflection meter 405 is connected to the output of the light system to monitor the light reflected within the system so as to determine the intensity of the light being applied to the variable optical attenuator system 420. The polarization-dependent loss controller 470 provides adjustment to the transmission system to control and minimize the polarization-dependent loss of the calibration system. The light source 400, the back reflection meter 405, and the polarization-dependent loss controller 470 are connected 460 by the serial link to the computer system 465. The computer system 465 provides controlling codes to activate and deactivate the light source 400 and to control the polarization-dependent loss controller 470. The back reflection measurements by the back reflection meter 405 to the computer system 465.

The output of the polarization-dependent loss controller 470 is the input to the optical switch 415. The optical switch 415 is in communication with the computer system 465 to select one a path through the switch to its output. The variable optical attenuator system 420 has multiple variable optical attenuator devices that are to be calibrated and each path at the output of the optical switch 415 is connected to one of the multiple variable optical attenuator devices. The optical switch 415 steers the light signal to the variable optical attenuator device that is being calibrated.

The power supply 425 is connected to the variable optical attenuator system 420 to provide necessary voltage to the variable optical attenuator system 420 being calibrated.

The outputs of the variable optical attenuator system 420 are connected to the inputs of the optical switch 450. The optical switch provides a path to connect a selected input to the output of the optical switch 450. The optical switch 450 is in communication with the computer 465 through the serial link 460 to provide the control signals that select which of the inputs of the optical switch 450 to its output. The output of the optical switch 450 is connected to the power meter 455. The power meter 455 determines the intensity of the light output of the variable optical attenuator device being measured. The power meter 455 is in communication with the computer system 465 through the serial link 460 to transfer the measurement of the intensity of the light signal as attenuated by the selected variable optical attenuator device.

The computer system 465 determines the attenuation for each setting or set of pulses that adjusts the variable optical attenuator device. The computer system 465 then transfers the measurement to the variable optical attenuator controller of the variable optical attenuator system 420. The variable optical attenuator system 420 stores the attenuation factor and the corresponding setting in the EEPROM of the variable optical attenuator system 420.

Referring back to FIG. 6 for a discussion of the communication protocol for calibrating the variable optical attenuator devices 305*a*, . . . , 305*d* of FIG. 4. The communication interface (serial link) 460 of FIG. 5 is in communication with the variable optical attenuator controller 325 to communicate the setting or number of pulses from the reference setting at which the variable optical attenuator devices 305*a*, . . . , 305*d* are set and the measured attenuation for the setting. The first calibration command (5) is transmitted from the computer system 465 to the variable optical attenuator controller to command the variable optical attenuator controller to send a control signal to the selected variable optical attenuator device 305*a*, . . . , 305*d* to force the selected variable optical attenuator device 305*a*, . . . , 305*d* to a number of steps or pulse from a zero (minimum attenuation) or reference setting. The second calibration setting (6) is a write command sent by the computer system 465 to the variable optical attenuator controller 325 instructing the variable optical attenuator controller 325 to write an attenuation factor with its corresponding setting to a specific address within the EEPROM 330. The third calibration command (7) is transmitted by the computer system 465 to instruct the variable optical attenuator controller 325 to read an address location from the EEPROM 330 and transmit the data to the computer system 465. This allows the computer system to verify that the EEPROM contains the correct attenuation factors for the settings or number of pulses of the control signal transmitted to the selected variable optical attenuator device 305*a*, . . . , 305*d*.

Figure 7:
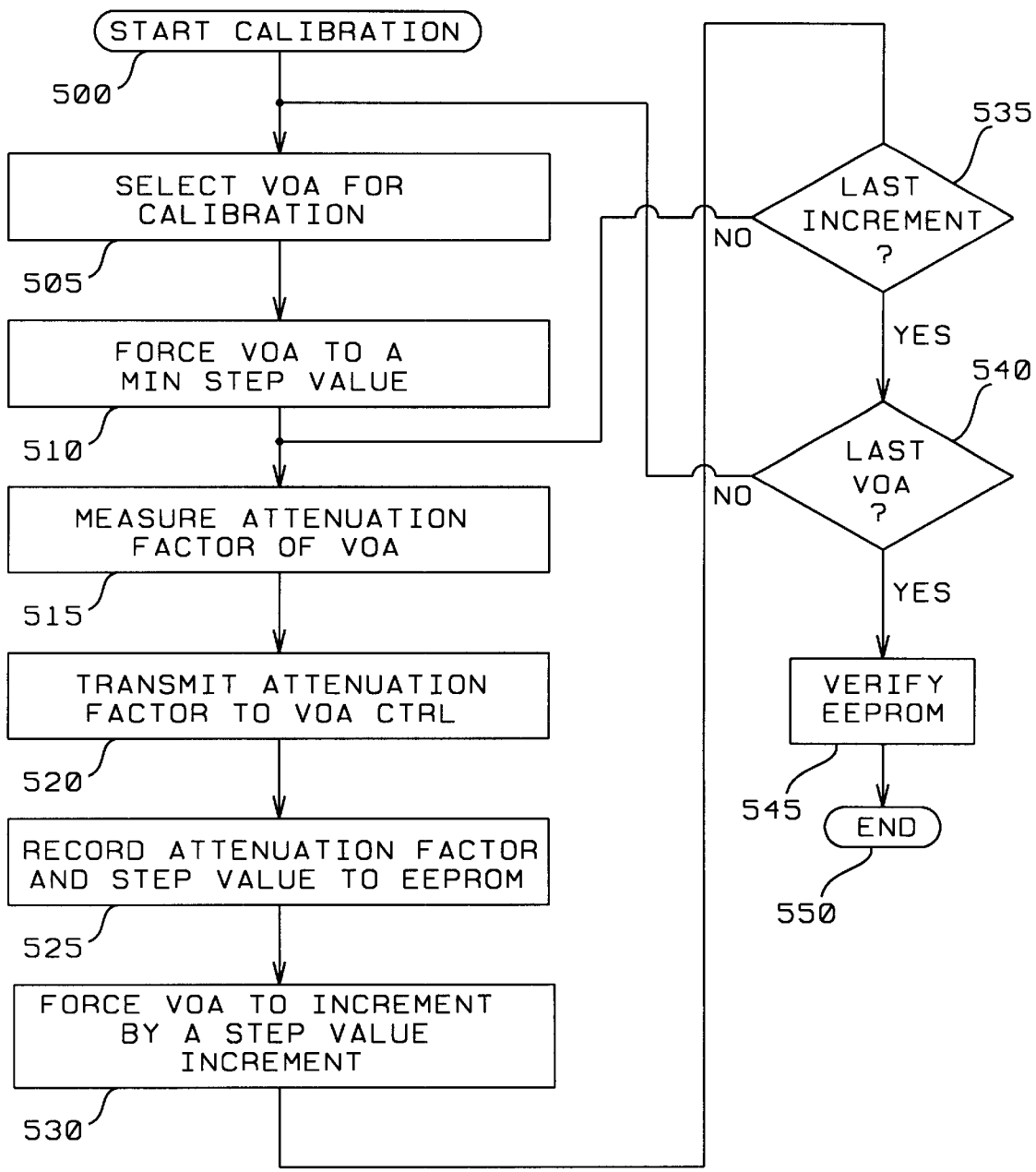
FIG. 7 is a flow diagram for the method for calibrating variable optical attenuators of this invention.

Refer now to FIG. 7 for a more complete discussion of the method for calibrating a variable optical attenuator system of this invention. The calibration starts (Box 500) by first selecting (Box 505) the variable optical attenuator device of the variable optical attenuator system that is to be calibrated. In the description of this method it is assumed that the variable optical attenuator system has multiple variable optical attenuator devices, however there in fact may be a single variable optical attenuator device within the system and still be in keeping with the intent of this invention.

The calibrating computer system transmits the first calibration command (5) to force (Box 510) the selected variable optical attenuator device to the zero (minimum attenuation) or reference point. The attenuation factor of the selected variable optical attenuator device is then measured (Box 515). The computer system then transmits the second calibration command (6) with the measured attenuation factor to the variable optical attenuator controller indicating the EEPROM location where the attenuation factor and the step or number of pulses from the reference point is to be retained. The variable optical attenuator controller notes the corresponding step or number of pulse from the reference point and stores the attenuation factor and the step or number pulses to the address location requested.

The calibrating computer system again transmits the first calibration command (5) to the variable optical attenuator controller to have the selected variable optical attenuator move to the next increment. The variable optical attenuator controller then forces (Box 530) the selected variable optical attenuator device to increment by the next step or block of pulses to force the variable optical attenuator device to the next setting for measurement. The calibrating computer system then examines (Box 535) the variable optical attenuator device to determine if the last increment is achieved. If the last increment has not been achieved, the attenuation is measured (Box 515) and the attenuation factor transmitted (Box 520) to the variable optical attenuator controller for storage (Box 525) with the corresponding step in the EEPROM. The variable optical attenuator device is then incremented (530) and the calibrating computer system (Box 535) whether the last increment is achieved. This is repeated until all the increments are measured and then the calibrating computer system determines (Box 540) whether all the variable optical attenuator devices of the variable optical attenuator system have been calibrated. If all the variable optical attenuator devices are not calibrated, the next variable optical attenuator device to be calibrated is selected (Box 505), forced (Box 510) and the steps (Boxes 515, 520, 525, 530) to characterize the attenuation versus the step or number of pulses from the minimum step or reference point are repeated until the variable optical attenuator device is calibrated. When all the variable optical attenuator devices for the variable optical attenuator system are calibrated the computer system requests that the variable optical attenuator controller read the contents of the EEPROM and transmit these readings to the calibrating computer system to verify (Box 545) that the calibration is recorded properly. Upon successful verification the procedure ends (Box 550).

Figure 8:
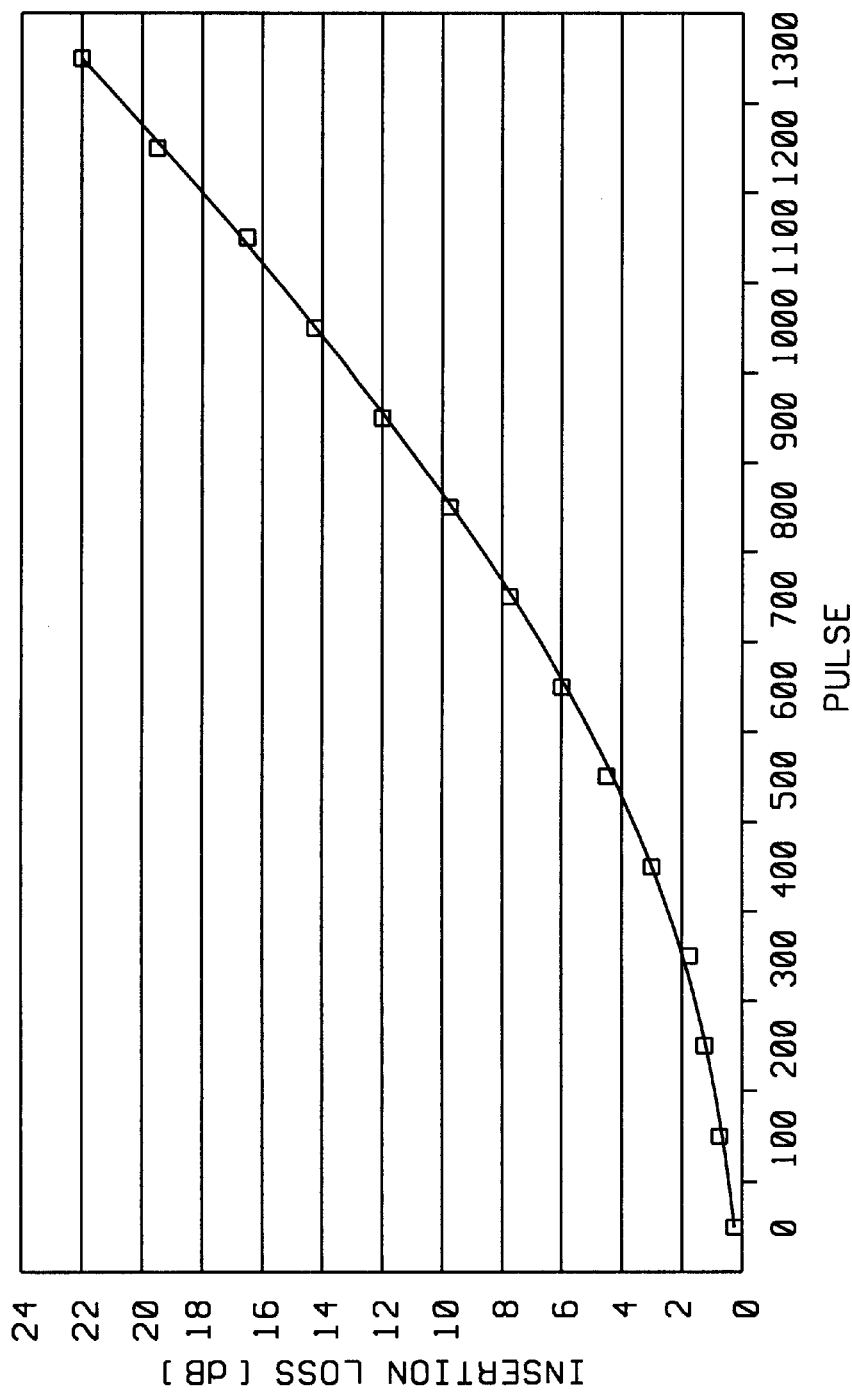
FIG. 8 is a plot of the number of pulses of the control signal from a reference point versus the attenuation for each setting of the control signal.

FIG. 8 illustrates a plot of characterization data that would be stored in the EEPROM of a single variable optical attenuator. The variable optical attenuator is forced to a setting of zero pulses and the measurement ($\approx$0.1 db) is recorded. The variable optical attenuator is then incremented by 100 pulses or steps in this case and the measurement recorded ($\approx$0.5 db). The variable optical attenuator is incremented by 100 pulses or steps or the total number of pulses from the reference point and each measurement is recorded until the last increment at 1300 pulses or steps is achieved and the measurement ($\approx$22.0 db) is recorded. The measurements maybe made for various environment factors such as temperature to account for the environmental factors as well.

While this invention has been particularly shown and described with reference to the preferred embodiments thereof, it will be understood by those skilled in the art that various changes in form and details may be made without departing from the spirit and scope of the invention.

The invention claimed is:

1. A variable optical attenuation system comprising:
   at least one variable optical attenuation device that receives a light signal, attenuates said light signal, and transmits an attenuated light signal;
   a controller circuit in communication with the variable optical attenuation device to provide an attenuation control signal to said variable optical attenuation device to cause the variable optical attenuation device to adjust an attenuation factor of said variable optical attenuation device;
   a data retaining device in communication with the controller circuit, said data retaining device having a listing of attenuation factors and corresponding attenuation control signals; and
   a communication interface to provide communication between said controller circuit and an external command system, said external command system indicating a desired attenuation factor, said control unit accessing the data retaining device to retrieve the corresponding attenuation control signal, and transmiting the corresponding attenuation control signal to the variable optical attenuation device, which then adjusts to assume the desired attenuation factor.

2. The variable optical attenuation system of claim 1 wherein the data retaining device is an EEPROM.

3. The variable optical attenuation system of claim 1 wherein said variable optical attenuation system is calibrated to correspond said attenuation factors to the attenuation control signals and store said attenuation factors and the corresponding control signals to the data retaining device.

4. The variable optical attenuation system of claim 1 wherein the communication interface is a serial data communication link.

5. The variable optical attenuation system of claim 1 wherein the communication interface has a communication protocol comprising:
   a current attenuation query code transmitted from the external command system requesting a current attenuation factor at which the variable optical attenuation device is set;
   a current attenuation response code transmitted from the controller circuit to the external command system indicating the current attenuation factor of the variable optical attenuation device;
   a select active device code transmitted from the external command system to the controller circuit indicating which variable optical attenuation device is to be active;
   a set active device attenuation code transmitted from the external command system to the controller circuit indicating the desired attenuation factor at which the active variable optical attenuation device is to be set; and
   a store active device attenuation code transmitted from the external command system to the controller circuit commanding the controller circuit to record a current attenuation factor for the active device.

6. The variable optical attenuation system of claim 1 wherein the communication interface has a calibration protocol to control calibration of the variable optical attenuator device comprising:
   an adjust variable optical attenuator device command transmitted from the external command system to the controller circuit commanding the controller circuit to send the attenuation control signal to a selected variable optical attenuator device to adjust to a setting from a reference attenuation factor;
   a write attenuation factor command transmitted by the external command system to the controller circuit to store a transmitted attenuation factor with its corresponding attenuation control signal to the data retaining device; and
   a read data retaining device command transmitted by the external command system to the controller circuit to request that the controller circuit access the data retaining device to read the attenuation factor and the corresponding attenuation control signal and transmit said attenuation factor and corresponding control signal to the external command system.

7. An optical transmission system comprising:

at least one light emission device to emit optical signals;

at least one first light transmission media, each first light transmission media being connected at one end to one of the light emission devices to transmit the optical signal over a distance;

at least one variable optical attenuation apparatus, each variable optical attenuation apparatus connected to an opposite end of the each of the first light transmission media to receive said optical signal and connected to each of at least one second light transmission media, each variable optical attenuation apparatus comprising:

at least one variable optical attenuation device that receives said optical signal, attenuates said optical signal, and transmits an attenuated optical signal to said second light transmission media;

a controller circuit in communication with the variable optical attenuation device to provide an attenuation control signal to said variable optical attenuation device to cause the variable optical attenuation device to adjust an attenuation factor of said variable optical attenuation device;

a data retaining device in communication with the controller circuit, said data retaining device having a listing of attenuation factors and corresponding attenuation control signals; and a communication interface to provide communication between said controller circuit and an external command system, said external command system indicating a desired attenuation factor, said control unit accessing the data retaining device to retrieve the corresponding attenuation control signal, and transmits the corresponding attenuation control signal to the variable optical attenuation device, which then adjusts to assume the desired attenuation factor.

8. The optical transmission system of claim 7 wherein the data retaining device is an EEPROM.

9. The optical transmission system of claim 7 wherein said variable optical attenuation apparatus is calibrated to correspond said attenuation factors to the attenuation control signals and store said attenuation factors and the corresponding control signals to the data retaining device.

10. The optical transmission system of claim 7 wherein the communication interface is a serial data communication link.

11. The optical transmission system of claim 7 wherein the communication interface has a communication protocol comprising:

a current attenuation query code transmitted from the external command system requesting a current attenuation factor at which the variable optical attenuation device is set;

a current attenuation response code transmitted from the controller circuit to the external command system indicating the current attenuation factor of the variable optical attenuation device;

a select active device code transmitted from the external command system to the controller circuit indicating which variable optical attenuation device is to be active;

a set active device attenuation code transmitted from the external command system to the controller circuit indicating the desired attenuation factor at which the active variable optical attenuation device is to be set; and a store active device attenuation code transmitted from the external command system to the controller circuit commanding the controller circuit to record a current attenuation factor for the active device.

12. The optical transmission system of claim 7 wherein the communication interface has a calibration protocol to control calibration of the variable optical attenuator device comprising:

an adjust variable optical attenuator device command transmitted from the external command system to the controller circuit commanding the controller circuit to send the attenuation control signal to a selected variable optical attenuator device to adjust to a setting from a reference attenuation factor;

a write attenuation factor command transmitted by the external command system to the controller circuit to store a transmitted attenuation factor with its corresponding attenuation control signal to the data retaining device; and a read data retaining device command transmitted by the external command system to the controller circuit to request that the controller circuit access the data retaining device to read the attenuation factor and the corresponding attenuation control signal and transmit said attenuation factor and corresponding control signal to the external command system.

13. A communication system for communicating between a control circuit of a variable optical attenuation apparatus and a command system to allow the control circuit to adjust an attenuation factor of at least one variable optical attenuation devices within the variable optical attenuation apparatus, said communication system comprises:

a receiving circuit in communication with the control circuit to receive an adjustment protocol and transfer said adjustment protocol to the control circuit;

a transmission medium connected to the receiving circuit to transmit the adjustment protocol to the receiving circuit; and a transmitting circuit connected between the transmission medium and the command system to transmit the adjustment protocol to the transmission medium;

wherein the adjustment protocol comprises:

a current attenuation query code transmitted from the external command system requesting a current attenuation factor at which the variable optical attenuation device is set;

a current attenuation response code transmitted from the controller circuit to the external command system indicating the current attenuation factor of the variable optical attenuation device, a select active device code transmitted from the external command system to the controller circuit indicating which variable optical attenuation device is to be active;

a set active device attenuation code transmitted from the external command system to the controller circuit indicating the desired attenuation factor at which the active variable optical attenuation device is to be set; and a store active device attenuation code transmitted from the external command system to the controller circuit commanding the controller circuit to record a current attenuation factor for the active device.

14. The communication system of claim 13 wherein the communication interface has a calibration protocol to control calibration of the variable optical attenuator device comprising:

an adjust variable optical attenuator device command transmitted from the external command system to the controller circuit commanding the controller circuit to send the attenuation control signal to a selected variable optical attenuator device to adjust to a setting from a reference attenuation factor;

a write attenuation factor command transmitted by the external command system to the controller circuit to store a transmitted attenuation factor with its corresponding attenuation control signal to the data retaining device; and a read data retaining device command transmitted by the external command system to the controller circuit to request that the controller circuit access the data retaining device to read the attenuation factor and the corresponding attenuation control signal and transmit said attenuation factor and corresponding control signal to the external command system.

15. The communication system of claim 13 wherein said communication system is a serial data link.

16. A method for calibration of a magnitude of an adjustment control signal versus an attenuation factor of a variable optical attenuation apparatus wherein said variable optical attenuation apparatus comprises:

at least one variable optical attenuation device that receives said optical signal, attenuates said optical signal, and transmits an attenuated optical signal to a light transmission media;

a controller circuit in communication with the variable optical attenuation device to provide the attenuation control signal to said variable optical attenuation device to cause the variable optical attenuation device to adjust the attenuation factor of said variable optical attenuation device;

a data retaining device in communication with the controller circuit, said data retaining device having a listing of attenuation factors and corresponding attenuation control signals; and a communication interface to provide communication between said controller circuit and an external command system, said external command system indicating a desired attenuation factor, said control unit accessing the data retaining device to retrieve the corresponding attenuation control signal, and transmits the corresponding attenuation control signal to the variable optical attenuation device, which then adjusts to assume the desired attenuation factor wherein said method comprises the steps of:
(a) selecting one variable optical attenuation device for calibration;
(b) forcing said variable optical attenuation device to a minimum step value;
(c) measuring an attenuation factor of said variable optical attenuation device;
(d) transmitting said attenuation factor to said control circuit;
(e) recording said attenuation factor and said minimum step value to said data retaining device;
(f) forcing said variable optical attenuation device to increment by a step value increment
(g) measuring said attenuation factor of said variable optical attenuation device;
(h) transmitting said attenuation factor to said control circuit;
(i) recording said attenuation factor and said minimum step value to said data retaining device;

(j) repeating steps (f) through (h) until a maximum attenuation factor is achieved;
(k) selecting a next variable optical attenuation device and performing steps (b) through (j); and
(l) repeatedly performing step (k) until all variable optical attenuation devices are calibrated.

17. The method of claim 16 wherein in forcing the variable optical attenuator comprises the steps of:

transmitting a step variable optical attenuator from the command system to the control circuit;

transmitting an attenuation control signal from the control circuit to the variable optical attenuation device; and adjusting the variable optical attenuation device according to a magnitude of the attenuation control signal.

18. The method of claim 16 wherein the data retaining device is an EEPROM.

19. The method of claim 16 wherein the communication interface is a serial data communication link.

20. The method of claim 16 wherein the communication interface has a communication protocol comprising:

a current attenuation query code transmitted from the external command system requesting a current attenuation factor at which the variable optical attenuation device is set;

a current attenuation response code transmitted from the controller circuit to the external command system indicating the current attenuation factor of the variable optical attenuation device;

a select active device code transmitted from the external command system to the controller circuit indicating which variable optical attenuation device is to be active;

a set active device attenuation code transmitted from the external command system to the controller circuit indicating the desired attenuation factor at which the active variable optical attenuation device is to be set; and a store active device attenuation code transmitted from the external command system to the controller circuit commanding the controller circuit to record a current attenuation factor for the active device.

21. The method of claim 16 wherein the communication interface has a calibration protocol to control calibration of the variable optical attenuator device comprising:

an adjust variable optical attenuator device command transmitted from the external command system to the controller circuit commanding the controller circuit to send the attenuation control signal to a selected variable optical attenuator device to adjust to a setting from a reference attenuation factor;

a write attenuation factor command transmitted by the external command system to the controller circuit to store a transmitted attenuation factor with its corresponding attenuation control signal to the data retaining device; and a read data retaining device command transmitted by the external command system to the controller circuit to request that the controller circuit access the data retaining device to read the attenuation factor and the corresponding attenuation control signal and transmit said attenuation factor and corresponding control signal to the external command system.

22. An apparatus for calibration of a magnitude of an adjustment control signal versus an attenuation factor of a variable optical attenuation apparatus wherein said variable optical attenuation apparatus comprises:

at least one variable optical attenuation device that receives said optical signal, attenuates said optical signal, and transmits an attenuated optical signal to a light transmission media, a controller circuit in communication with the variable optical attenuation device to provide the attenuation control signal to said variable optical attenuation device to cause the variable optical attenuation device to adjust the attenuation factor of said variable optical attenuation device;

a data retaining device in communication with the controller circuit, said data retaining device having a listing of attenuation factors and corresponding attenuation control signals; and a communication interface to provide communication between said controller circuit and an external command system, said external command system indicating a desired attenuation factor, said control unit accessing the data retaining device to retrieve the corresponding attenuation control signal, and transmits the corresponding attenuation control signal to the variable optical attenuation device, which then adjusts to assume the desired attenuation factor;

wherein said method comprises the steps of:
   (a) means for selecting one variable optical attenuation device for calibration;
   (b) means for forcing said variable optical attenuation device to a minimum step value;
   (c) means for measuring an attenuation factor of said variable optical attenuation device;
   (d) means for transmitting said attenuation factor to said control circuit;
   (e) means for recording said attenuation factor and said minimum step value to said data retaining device;
   (f) means for forcing said variable optical attenuation device to increment by a step value increment;
   (g) means for measuring said attenuation factor of said variable optical attenuation device;
   (h) means for transmitting said attenuation factor to said control circuit;
   (i) means for recording said attenuation factor and said minimum step value to said data retaining device;
   (j) means for repeated operating the means of (f) through (h) until a maximum attenuation factor is achieved;
   (k) means for selecting a next variable optical attenuation device and means for operating, (b) through (j); and
   (l) means for repeatedly operating means (k) until all variable optical attenuation devices are calibrated.

23. The apparatus of claim 22 wherein in forcing the variable optical attenuator comprises the steps of:

means for transmitting a command to step the variable optical attenuator from the command system to the control circuit;

means for transmitting an attenuation control signal from the control circuit to the variable optical attenuation device; and means for adjusting the variable optical attenuation device according to a magnitude of the attenuation control signal.

24. The apparatus of claim 22 wherein the data retaining device is an EEPROM.

25. The apparatus of claim 22 wherein said variable optical attenuation apparatus is calibrated to correspond said attenuation factors to the attenuation control signals and store said attenuation factors and the corresponding control signals to the data retaining device.

26. The apparatus of claim 22 wherein the communication interface is a serial data communication link.

27. The apparatus of claim 22 wherein the communication interface has a communication protocol comprising:

a current attenuation query code transmitted from the external command system requesting a current attenuation factor at which the variable optical attenuation device is set;

a current attenuation response code transmitted from the controller circuit to the external command system indicating the current attenuation factor of the variable optical attenuation device;

a select active device code transmitted from the external command system to the controller circuit indicating which variable optical attenuation device is to be active;

a set active device attenuation code transmitted from the external command system to the controller circuit indicating the desired attenuation factor at which the active variable optical attenuation device is to be set; and a store active device attenuation code transmitted from the external command system to the controller circuit commanding the controller circuit to record a current attenuation factor for the active device.

28. The apparatus of claim 22 wherein the communication interface has a calibration protocol to control calibration of the variable optical attenuator device comprising:

an adjust variable optical attenuator device code transmitted from the external command system to the controller circuit commanding the controller circuit to send the attenuation control signal to a selected variable optical attenuator device to adjust to a setting from a reference attenuation factor;

a write attenuation factor code transmitted by the external command system to the controller circuit to store a transmitted attenuation factor with its corresponding attenuation control signal to the data retaining device; and a read data retaining device code transmitted by the external command system to the controller circuit to request that the controller circuit access the data retaining device to read the attenuation factor and the corresponding attenuation control signal and transmit said attenuation factor and corresponding control signal to the external command system.

* * * * *